April 5, 1966    B. BLAIR    3,244,150
BIRD FEEDER
Filed Nov. 12, 1964

INVENTOR
BENTON BLAIR
BY
SCHULZE, BLAIR & BENOIT
ATTORNEY

United States Patent Office 3,244,150
Patented Apr. 5, 1966

3,244,150
BIRD FEEDER
Benton Blair, East Woodstock, Conn., assignor to
Farnham Blair, Arlington, Va.
Filed Nov. 12, 1964, Ser. No. 410,419
3 Claims. (Cl. 119—52)

This invention relates to a feeder for song birds.

One of the objects of this invention is to provide a bird feeder which will be simple, practical and thoroughly durable. Another object is to provide a feeder having the above characteristics which will be strong and well able to withstand continuous hard usage. Another object is to provided a feeder having the above characteristics whose manufacture will be economical both from the standpoint of labor and materials used. Still another object is to provide a feeder having the above characteristics which may be easily and quickly refilled. A further object is to provide a feeder having the above characteristics specifically designed to feed birds which do not require a perch but which may be converted so that birds requiring a perch may feed from it. A still further object is to provide a feeder having the above characteristics which is light in weight. Other objects will be in part obvious and in part pointed out hereinafter.

The invention, accordingly, consists in the features of construction, combinations of elements, and arrangements of parts as will be exemplified in the structure to be hereinafter described, and the scope of the application which will be indicated in the following claims.

Briefly, the invention consists of a blow-molded bottle shaped feeder having a handle on the top for suspending it and a filling opening in the bottom. The feeder has a pair of feeding pockets from the bottom of which birds may remove seeds from the feeder. A cap is used to cover the filling opening and birds suspend themselves from the edge of the cap during feeding. For other birds which require a perch, a perch member is mounted on the feeder between the cap and the body of the feeder to provide perches at each feeding pocket.

As conducive to a clearer understanding of this invention, many people feed birds to attract them to their yards. Some people because of the cost of feed like to limit the birds they attract to birds such as the chick-a-dee and nuthatch which can hang in a vertical position while picking up seed. This feeder is particularly designed for feeding sunflower seeds to this type of bird. However, if a person desires to feed birds requiring a perch, the detachable perch is mounted on the feeder. This provides perches at each feeding pocket.

Referring now to the drawings in which one of the various possible embodiments of this invention is shown, FIGURE 1 is an exploded perspective view of the feeder;

Similar reference characters refer to similar parts throughout the several views of the drawing.

Figure 1:
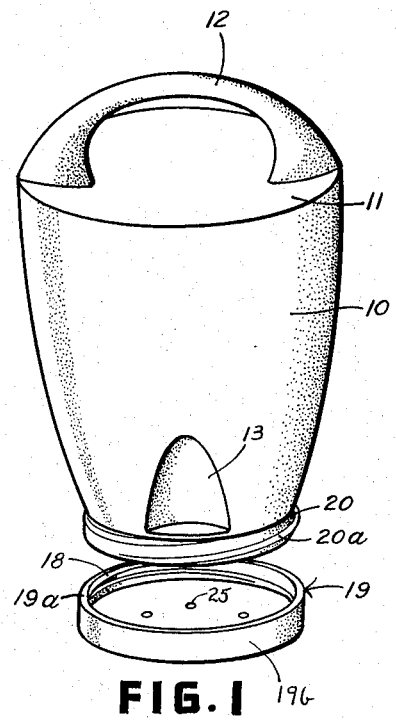

Referring to FIGURE 1, the feeder, which is blow molded, includes a side wall 10, a solid top 11, and a handle 12. Adjacent the bottom of the feeder a pair of feeding pockets 13 and 14 extend inwardly into side wall 10. A pair of recessed openings 15 and 16 (FIGURE 2) are provided at the bottom of the feeding pockets so that seeds may be removed from the interior of the feeder. At the outer edge of openings 15 and 16 and extending downwardly therefrom is a threaded cylindrically shaped cap supporting wall 20. The threads 20a (FIGURE 1) are complementary to the threads 18 on a cap, generally indicated at 19.

Figure 5:
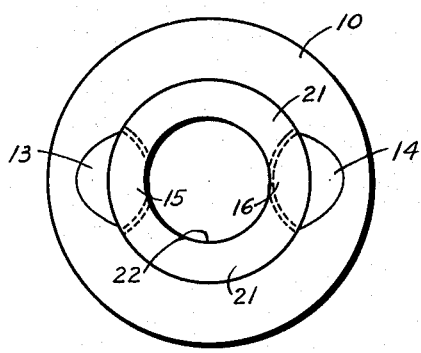
FIGURE 5 is a bottom plan view of the feeder with the cap removed.

There is a flange 21 (FIGURES 2 and 5) extending inwardly from the bottom edge of threaded wall 20. Flange 21 surrounds an opening 22 through which the feeder is filled. It will be noted that flange 21 (FIGURE 5) extends inwardly beyond the inner portions of openings 15 and 16 through which the birds feed. Thus, when the feeder is inverted and seeds are poured into its interior through opening 22, they do not spill out of openings 15 and 16.

Figure 2:
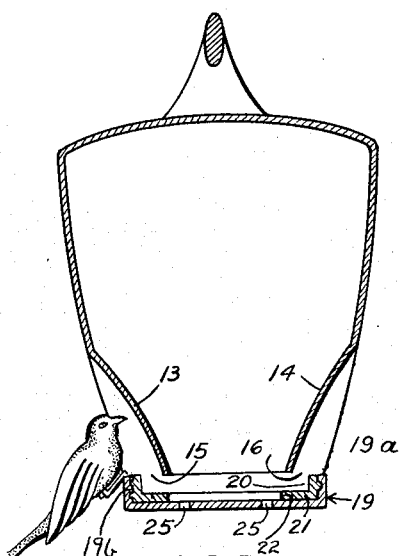
FIGURE 2 is a vertical cross section of the feeder taken through the centers of the diagonally disposed feeding pockets and illustrating a bird able to feed in a hanging position suspended from the edge of the feeding cap.

It will be noted that the side wall 19b of cap 19 is as deep as threaded wall 20 (FIGURE 2). Thus, when cap 19 is screwed in place, it reinforces the relatively thin blow molded wall 20 of the feeder and its top edge 19a presents a wide edge on which chick-a-dees and similar birds can hang during feeding without danger of damaging their feet. It will be noted that cap 19 is provided with holes 25 (FIGURE 2) in its bottom so that any water entering the feeder through the feeding pockets will drain out through the cap.

Figure 3:
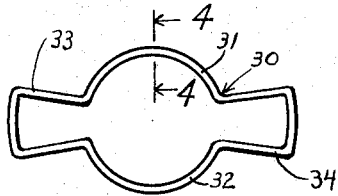
FIGURE 3 is a top plan view on an enlarged scale of the removable perch.
Figure 4:
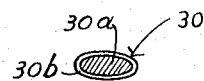
FIGURE 4 is a cross section on an enlarged scale of the perch taken on the line 4—4 of FIGURE 3.
Figure 6:
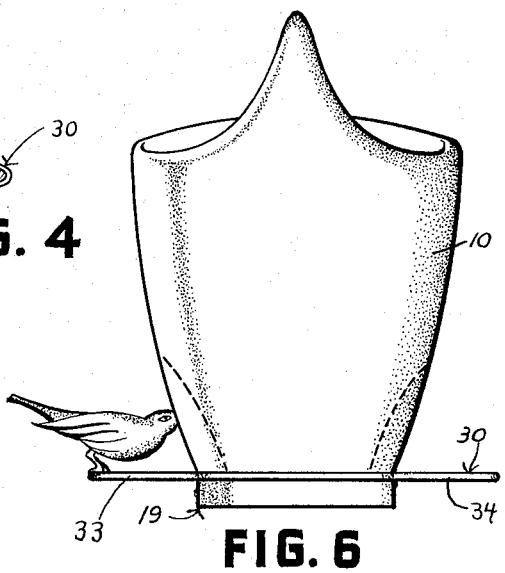
FIGURE 6 is a side elevation of the feeder with the removable perch mounted on the feeder and a bird of the type requiring a perch in feeding position.

Referring to FIGURES 3, 4 and 6, a removable perch generally indicated at 30 is shown. The perch has a wire core 30a (FIGURE 4) covered with plastisol 30b. Wire core 30a is resilient and includes two semi-circular sections 31 and 32 which are positioned between the top edge of cap 19 and the lower edge of the body 10 of the feeder. The distance between semi-circular sections 31 and 32 is slightly less than the diameter of cap 19. Thus, when they are spread apart, they snap onto wall 20. Cap 19 holds detachable perch 30 in place against the lower end of side wall 10. The perch is provided with two sections 33 and 34 which serve as perches for birds that require them (FIGURE 6).

In order to fill the feeder, it is inverted and cap 19 is removed. This exposes hole 22 (FIGURE 5) through which seed are poured into the interior of the feeder. During the filling operation, flange 21 prevents seed from flowing out of openings 15 and 16. When the feeder has been filled, cap 19 is threaded onto the bottom of the feeder, the feeder inverted and then hung by handle 12 from a suitable support.

Thus, it will be seen that a feeder has been disclosed which is attractive in appearance, light in weight, and inexpensive to manufacture. Furthermore, it is easy to fill and is to constructed that the type of birds to be fed may be selected by suspending the feeder either with or without the removable perch. It will also be seen that the seeds within the feeder are protected from the elements except for the water or snow entering the feeding pockets. This water drains from cap 19 through the holes in its bottom.

As many possible embodiments may be made of the above invention and as many changes may be made of the embodiment above set forth, or shown in the accompanying drawing, it is to be understood that all matter hereinabove set forth is to be interpreted as illustrative and not in a limiting sense.

I claim:

1. In a bird feeder, in combination, a thin hollow body member, means of said body member for suspending said body member in spaced relationship with respect to the ground, means forming a recessed feeding opening in a lower portion of the side wall of said body member, a cap-supporting wall extending downwardly from the lower end of said body member side wall, means forming a filling opening in the lower end of said body member, said feeding and filling openings being the only openings in said body member, a cap having a bottom and a side wall, means for connecting the side wall of said cap to said cap-supporting wall, the bottom of said cap closing said filling opening, the upper edge of the side wall of said cap lying in a horizontal plane and being aligned with said feeding opening, the upper edge of said cap forming a support for birds to cling to while feeding, said feeding opening being recessed within the plane of the upper edge of said cap, and drainage means in the bottom of said cap.

2. In a bird feeder, in combination, a hollow body member adapted to be suspended in spaced relation with respect to the ground, means forming a recessed feeding pocket in the side wall of said body member extending inwardly into said body member, means forming a feeding opening in said body member at the lower end of said feeding pocket, a cylindrically-shaped, cap-supporting wall extending downwardly from the lower end of said body member side wall, a portion of the upper edge of said cap-supporting side wall forming an edge of said opening, means forming a filling opening in the bottom of said body member, a flange extending inwardly from the lower edge of said cap-supporting side wall to the edge of said filling opening, said flange keeping seed from pouring out said first mentioned opening when said feeder is being filled, and a cap for closing said filling opening, means for connecting said cap to said cap-supporting wall, the vertical side wall of said cap reinforcing said cap-supporting wall and its upper edge being positioned adjacent said feeding opening to form a support for birds while feeding from said feeding opening.

3. A bird feeder as defined by claim 2 including a perch member having a circular opening therein adapted to fit over said cylindrically shaped cap-supporting wall, the edge of said perch member around the circular opening being gripped between the upper edge of said cap and the lower edge of said body member side wall when said cap is mounted on said cap-supporting wall.

References Cited by the Examiner

UNITED STATES PATENTS

| | | | |
|---|---|---|---|
| 2,705,938 | 4/1955 | Greenough | 119—52 |
| 2,936,734 | 5/1960 | Chestnut et al. | 119—52 |
| 3,136,296 | 6/1964 | Luin | 119—52 |

SAMUEL KOREN, *Primary Examiner.*

HUGH R. CHAMBLEE, *Examiner.*